United States Patent [19]

Kinkaide

[11] Patent Number: 5,487,586
[45] Date of Patent: Jan. 30, 1996

[54] FRAME FOR SECURING A WIND DEFLECTOR TO A TRAILER

[75] Inventor: James R. Kinkaide, Elkhart, Ind.

[73] Assignee: Wells Cargo, Inc., Elkhart, Ind.

[21] Appl. No.: 180,138

[22] Filed: Jan. 11, 1994

[51] Int. Cl.$^6$ ................................................ B62D 35/00
[52] U.S. Cl. ................................ 296/180.1; 296/180.4
[58] Field of Search ................................ 296/180.1, 180.4, 296/180.5

[56] References Cited

U.S. PATENT DOCUMENTS

| | | | |
|---|---|---|---|
| 3,239,267 | 3/1966 | Reynolds | 296/180.4 X |
| 3,425,740 | 2/1969 | De Vaughn | 296/180.4 X |
| 3,866,967 | 2/1975 | Landry et al. | 296/180.4 |
| 3,977,716 | 8/1976 | Whited | 296/180.4 |
| 4,030,779 | 6/1977 | Johnson | 296/180.4 |
| 4,088,362 | 5/1978 | Mollura | 296/180.4 |
| 4,103,957 | 8/1978 | Landry et al. | 296/180.4 |
| 4,170,378 | 10/1979 | Jacobsen | 296/180.4 |
| 4,310,192 | 1/1982 | Fitzgerald | 296/180.4 |
| 4,313,635 | 2/1982 | Front | 296/180.3 |
| 4,427,229 | 1/1984 | Johnson | 296/180.4 |
| 4,468,060 | 8/1984 | FitzGerald et al. | 296/180.4 |
| 4,707,015 | 11/1987 | Klomfass | 296/180.4 |
| 5,332,280 | 7/1994 | Dupont et al. | 296/180.4 X |

FOREIGN PATENT DOCUMENTS

| | | | |
|---|---|---|---|
| 823209 | 4/1981 | U.S.S.R. | 296/180.4 |
| 3023280 | 11/1993 | WIPO | 296/180.5 |

*Primary Examiner*—Joseph D. Pape
*Attorney, Agent, or Firm*—Barnes & Thornburg

[57] ABSTRACT

A frame for securing a wind deflector to a trailer includes a pair of vertically extending pivot tubes and brackets. The tubes include swing C washers which hook about a rod on each bracket. A pair of vertically extending support tubes is spaced apart by a pair of horizontal crossbars. The vertical pivot and support tubes are joined by upper and lower horizontal pivot tubes. The lower horizontal pivot tubes are spaced apart by an adjustable horizontal crossbar. Legs equipped with brackets extend from both ends of each vertical support tube. The wind deflector is secured to the frame by fasteners inserted in the brackets on the legs. In its lower position, the deflector is flush against the side of the trailer. The deflector may be raised to an intermediate position by pulling it away from the trailer, thereby swinging the horizontal pivot tubes outwardly with the vertical support tubes. As this occurs, a swing C washer disengaging rod on the upper horizontal pivot tubes strikes a rod on each swing C washer and disengages it from the rod on the bracket to which it is secured. The deflector may then be raised above the trailer by pivoting the deflector and frame about the point of attachment between the vertical pivot tubes and the brackets. The rotation of the deflector above the trailer is limited by a stop member. A locking handle may be inserted through holes in the vertical pivot tube and bracket to lock the deflector in place.

28 Claims, 7 Drawing Sheets

FRAME FOR SECURING A WIND DEFLECTOR TO A TRAILER

BACKGROUND AND SUMMARY OF THE INVENTION

The present invention relates to wind deflectors for trailers, and, in particular, to an improved frame for pivotally securing a wind deflector to a trailer.

Various wind deflectors are used on the fronts of trailers and similar vehicles to reduce drag on the trailer caused by the wind. These deflectors may take several forms. For example, they may be designed to inflate automatically when the trailer is in motion, such as the deflector is shown in U.S. Pat. No. 4,707,015 to Klomfass. Similarly, the deflector may include preinflated members secured to the trailer by a flexible covering, such as is shown in U.S. Pat. No. 4,030,779 to Johnson. Alternatively, the deflector may be a rigid structure, such as the deflector shown in U.S. Pat. No. 4,310,192 to Fitzgerald.

At times, it may be desirable to move the deflector away from the front of the trailer. This is particularly true if the trailer doors are located at the front of the trailer. In such situations, the deflector must be moved to allow the doors to be fully opened for easier loading and unloading of the trailer. Although it is possible to completely remove the deflector from the trailer when desired, such a procedure is not particularly convenient. Alternatively, the deflector may be attached to the trailer so as to be movable away from the front of the trailer, as shown in the '192 patent. However, the device disclosed in the '192 patent only pivots upwardly to permit access to refrigeration components, not to allow the doors of the trailer to open fully. Indeed, the trailer shown in the '192 patent does not have doors on the front side thereof. Accordingly, use of the device disclosed in the '192 patent would not solve the problem associated with the use of wind deflectors on trailers having doors located on the front of the trailer. That is, use of the '192 device would still not permit the deflector to be moved away from the front of the trailer so as to allow the doors to be fully opened.

Accordingly, it is an object of the present invention to provide an improved device for attaching a wind deflector to a trailer.

Another object of the present invention is to provide a device for attaching a wind deflector to a trailer so as to allow the deflector to be moved to allow access to the front of the trailer.

Yet another object of the present invention is the provision of a device for attaching a deflector to a trailer so as to allow the deflector to be moved away from the trailer so that the trailer doors may be completely opened.

These and other objects of the present invention are attained by the provision of a frame for pivotally securing a wind deflector to a trailer. The frame includes a pair of vertically extending pivot tubes secured to brackets. Each vertical pivot tube includes a swing C washer thereon which hooks about a hinge rod on each bracket. A pair of vertically extending support tubes is held in spaced apart relation by a pair of horizontal crossbars. The vertical pivot tubes and vertical support tubes are joined by upper and lower horizontal pivot tubes. The lower horizontal pivot tubes are held in spaced apart relation by an adjustable horizontal crossbar. Adjustable legs extend from both ends of each vertical support tube. Each leg is equipped with a bracket. The wind deflector is secured to the frame via bolts or similar fasteners inserted in the brackets on the adjustable legs and into the wind deflector. In its lower-most position, the wind deflector is flush against the side of the trailer to which it is mounted. The wind deflector may be raised to an intermediate position by pulling it outwardly away from the trailer such that the upper and lower horizontal pivot tubes swing outwardly with the vertical support tubes. As this occurs, a swing C washer disengaging rod on each of the upper horizontal pivot tubes strikes a rod on each swing C washer and disengages it from the hinge rod on the bracket to which it is secured. The wind deflector may then be fully raised above the trailer by pivoting the wind deflector and frame about the point of attachment between the vertical pivot tubes and the brackets. The rotation of the wind deflector and frame above the trailer is limited by a stop member on one of the brackets. When the rotational limit is reached, one of the vertical pivot tubes strikes the stop member. At this point, a locking handle may be inserted through holes in the vertical pivot tube and bracket so as to lock the wind deflector in its fully raised position. In this position, trailer doors on the side of the trailer to which the wind deflector is mounted may be opened and closed conveniently.

DETAILED DESCRIPTION OF THE PREFERRED EMBODIMENTS

Figure 1:
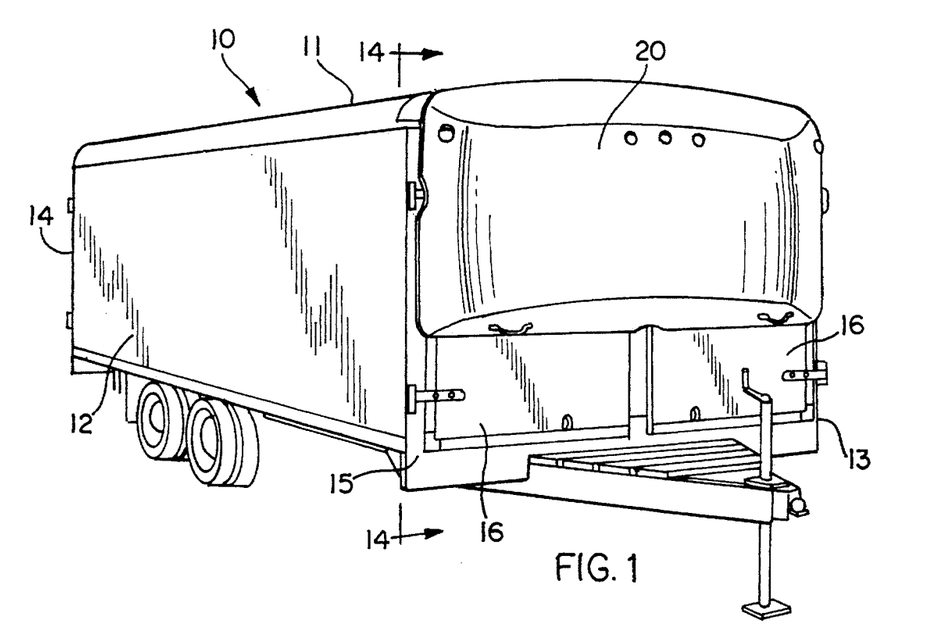
FIG. 1 is a perspective view of a trailer with a wind deflector attached thereto by a frame according to the present invention.

FIG. 1 shows a perspective view of a trailer 10 having a wind deflector 20 attached to the front thereof. Trailer 10 includes top 11, right side 12, left side 13, back 14 and front 15. Front 15 is provided with a pair of doors 16.

Figure 2:
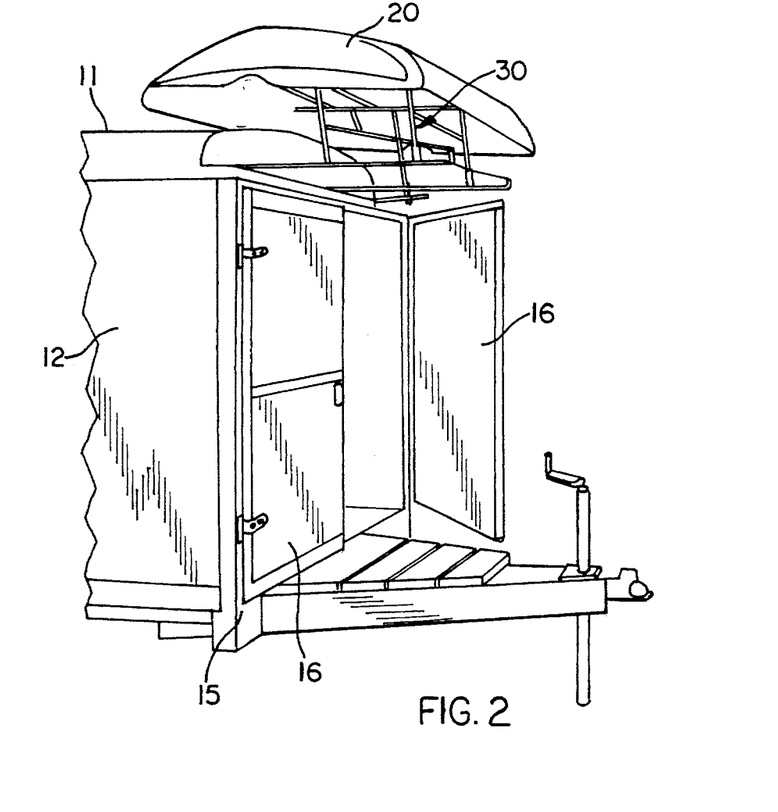
FIG. 2 is a perspective view of the front portion of the trailer shown in FIG. 2, with the wind deflector in the up position and one of the trailer doors open.

FIG. 2 shows a perspective view of the front portion of trailer 10. In this view, wind deflector 20 has been raised so that doors 16 may be opened. As can be seen with wind deflector 20 in the raised position, wind deflector 20 is secured to trailer 10 by a frame 30 according to the present invention.

Figure 3:
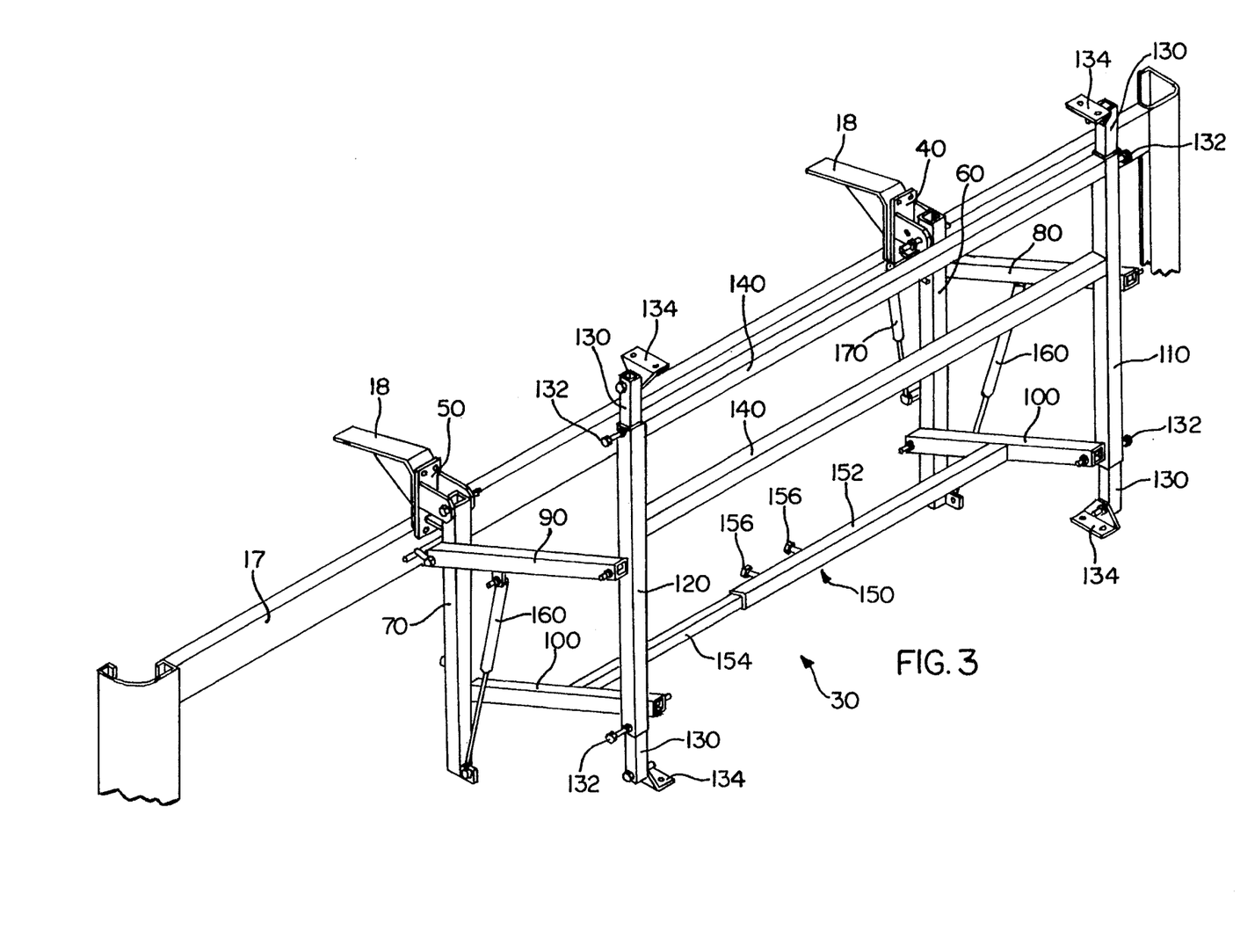
FIG. 3 is a perspective view of a frame for attaching a wind deflector to a trailer according to the present invention.
Figure 4:
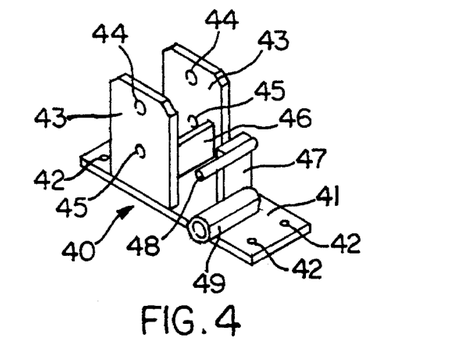
FIG. 4 is a perspective view of a first bracket, which is a component of a frame according to the present invention.
Figure 5:
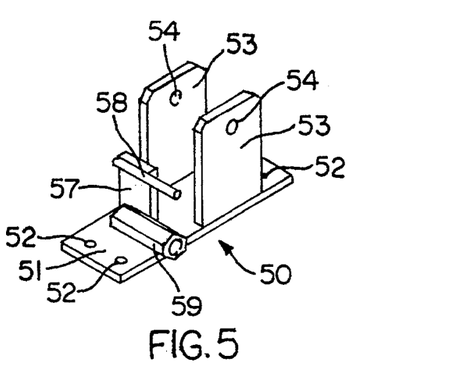
FIG. 5 is a perspective view of a second bracket, which is a component of a frame according to the present invention.

FIG. 3 shows a perspective view of frame 30 according to the present invention in its intermediate position, as opposed to the fully raised position shown in FIG. 2. Trailer 10 includes an interior frame 17 having brackets 18 attached thereto. Frame 30 is secured to trailer 10 by attaching a first bracket 40 to one bracket 18 and attaching a second bracket 50 to the other bracket 18. Frame 30, in addition to first bracket 40 and second bracket 50, generally comprises a first vertical pivot tube 60, a second vertical pivot tube 70, a first upper horizontal pivot tube 80, a second upper horizontal pivot tube 90, two lower horizontal pivot tubes 100, a first vertical support tube 110, a second vertical support tube 120, two horizontal crossbars 140, an adjustable horizontal crossbar 150, a first pair of gas rods 160, and a second pair of gas rods 170. These components will now be described in greater detail with reference to FIGS. 4–13 before describing the assembly and operation of frame 30.

First bracket 40 (FIG. 4) includes mounting plate 41 having mounting holes 42 therein. Bracket 40 further includes two plates 43 extending vertically from mounting plate 41. Each plate 43 includes a first hole 44 and a second hole 45 therein. The function of holes 44 and 45 is described below. A stop member 46 is disposed between plates 43 and extends in a generally perpendicular direction from mounting plate 41. Hinge plate 47 extends generally perpendicularly from mounting plate 41. Hinge rod 48 is attached to one surface of hinge plate 47. Barrel nut 49 is attached to the same surface of hinge plate 47 as rod 48 and is in spaced-apart relation from mounting plate 41.

Second bracket 50 (FIG. 5) is substantially similar to first bracket 40. Thus, second bracket 50 includes mounting plate 51 having mounting holes 52 therein. Second bracket 50 further includes two plates 53 extending vertically from mounting plate 51. Each plate 53 includes a hole 54. Hinge plate 57 extends generally perpendicularly from mounting plate 51. Hinge rod 58 is attached to one surface of hinge plate 57. Barrel nut 59 is attached to the same surface of hinge plate 57 as rod 58 and is in spaced-apart relation from mounting plate 51. Note that unlike first bracket 40, each plate 53 of second bracket 50 includes only one hole 54 and does not include a second hole, such as holes 45 in plates 43. Additionally, second bracket 50 does not include a stop member between plates 53, as with stop member 46 between plates 43 of first bracket 40.

Figure 6:
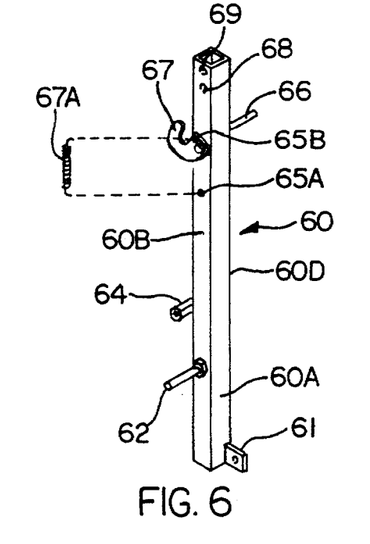
FIG. 6 is a perspective view of a first vertical pivot tube, which is a component of a frame according to the present invention.

Turning to FIG. 6, first vertical pivot tube 60 is a generally square tube having a first side 60A, a second side 60B, a third side 60C and a fourth side 60D. Bracket 61 extends perpendicularly from side 60A at one end of first vertical pivot tube 60. A first shoulder bolt 62 extends from side 60B in a direction generally perpendicular thereto. Barrel nut 64 is secured to side 60C above first shoulder bolt 62 and extends in the same direction. Swing C washer 67 is attached to side 60B. Side 60B is provided with a mounting hole 65A and swing C washer 67 is provided with a mounting hole 65B for securing spring 67A to first vertical pivot tube 60 and swing C washer 67. A second shoulder bolt 66 extends from side 60D in a direction generally perpendicular thereto. A pair of holes 68 and 69 is located in sides 60B and 60D.

Figure 7:
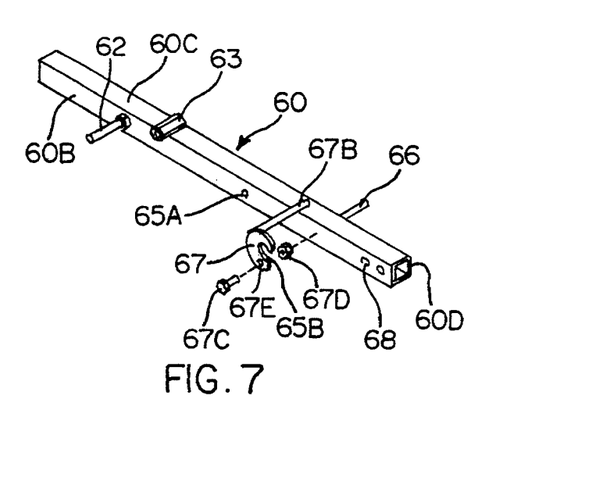
FIG. 7 is a second perspective view of the vertical pivot tube shown in FIG. 6.

Turning to FIG. 7, another perspective view of first vertical pivot tube 60 is shown, as well as an exploded view of swing C washer 67, without spring 67A. As can be seen in FIG. 7, swing C washer 67 includes a rod 67B attached thereto, a bolt 67C and a nut 67D. Nut 67D is welded to side 60B of first vertical pivot tube 60 such that the opening in nut 67D is positioned over a hole (not shown) in side 60B. Bolt 67C is then inserted through a hole 67C in swing C washer 67 and secured in nut 67D. Bolt 67E may extend into first vertical pivot tube 60 through the hole in side 60B. In this manner, swing C washer 67 is secured to first vertical pivot tube 60 such that rod 67B extends parallel to side 60C and beyond the corner where side 60C meets side 60D. Spring 67A may then be attached by inserting one free end of spring 67A into mounting hole 65A and inserting the second free end of spring 67A in mounting hole 65B.

Figure 8:
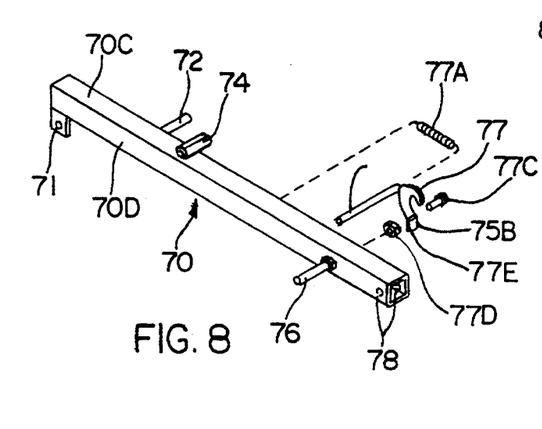
FIG. 8 is a perspective view of a second vertical pivot tube, which is a component of a frame according to the present invention.

Turning to FIG. 8, second vertical pivot tube 70 can be seen. Second vertical pivot tube 70 is a mirror image of first vertical pivot tube 60, with two differences described below. Thus, second vertical pivot tube 70 is a generally square tube having a first side 70A, a second side 70B, a third side 70C and a fourth side 70D. Bracket 71 extends perpendicularly from side 70A at one end of second vertical pivot tube 70. A first shoulder bolt 72 extends from side 70B in a direction generally perpendicular thereto. Barrel nut 74 is secured to side 70C above first shoulder bolt 72 and extends in the same direction. Swing C washer 77 is attached to side 70B and includes rod 77B attached thereto, a bolt 77C and a nut 77D. Nut 77D is welded to side 70B of second vertical pivot tube 70 such that the opening in nut 77D is positioned over a hole (not shown) in side 70B. Side 70B is provided with a mounting hole corresponding to mounting hole 65A in first vertical pivot tube 60 and swing C washer 77 is provided with a mounting hole 75B. Swing C washer 77, including spring 77A, is secured to second vertical pivot tube 70 in the same manner as swing C washer 67 is secured to first vertical pivot tube 60. A second shoulder bolt 76 extends from side 70D in a direction generally perpendicular thereto. Note that second vertical pivot tube 70 only includes one set of holes 78 in sides 70B and 70D. This is in contrast to first vertical pivot tube 60, which includes holes 68 and 69. First vertical pivot tube 60 is slightly longer than second vertical pivot tube 70 so as to provide an area above holes 68 in which holes 69 may be formed. The function of the additional holes and added length of first vertical pivot tube 60 is described below.

Figure 9:
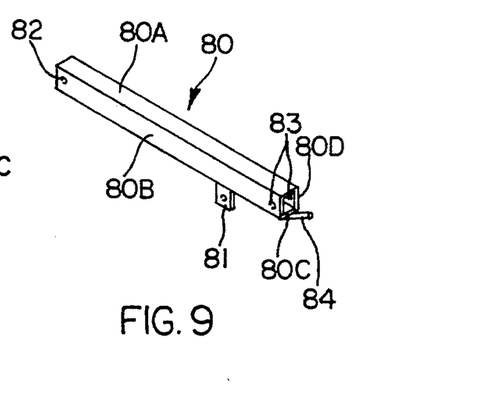
FIG. 9 is a perspective view of a first upper horizontal pivot tube, which is a component of a frame according to the present invention.
Figure 10:
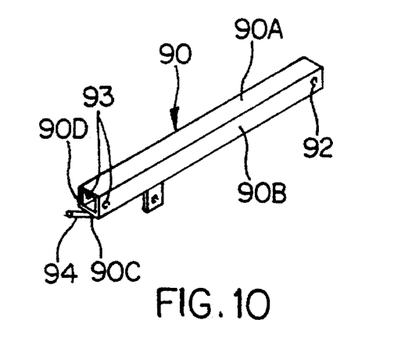
FIG. 10 is a perspective view of a second upper horizontal pivot tube, which is a component of a frame according to the present invention.
Figure 11:
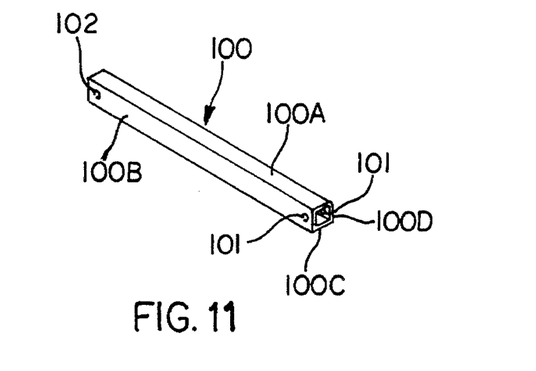
FIG. 11 is a perspective view of a lower horizontal pivot tube, which is a component of a frame according to the present invention.
Figure 12:
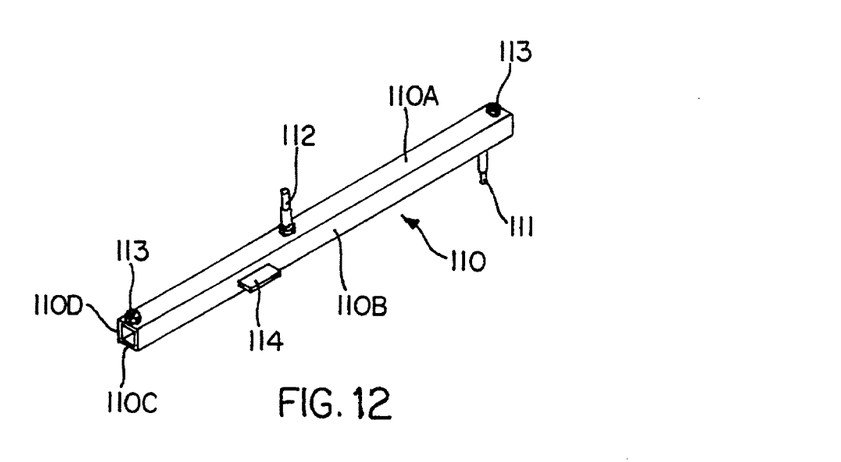
FIG. 12 is a perspective view of a first vertical support tube, which is a component of a frame according to the present invention.
Figure 13:
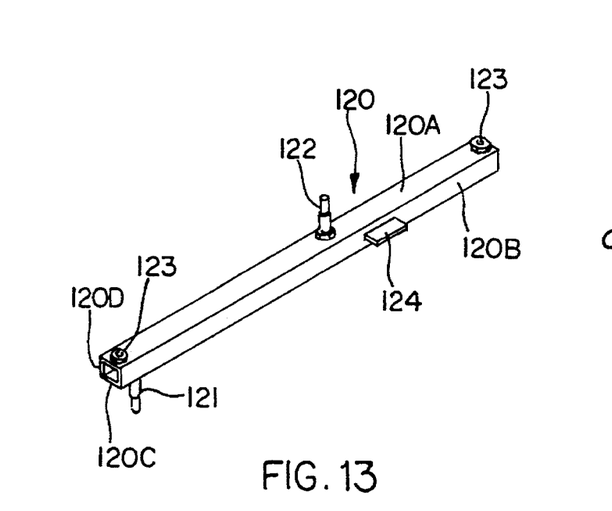
FIG. 13 is a perspective view of a second vertical support tube, which is a component of a frame according to the present invention.

FIG. 9 shows first upper horizontal pivot tube 80. First upper horizontal pivot tube 80 is a generally square tube having first side 80A, second side 80B, third side 80C and fourth side 80D. A bracket 81 extends from side 80C in a direction generally perpendicular thereto. A pair of holes 82 is located at one end of first upper horizontal pivot tube 80 in first side 80A and third side 80C. A second set of holes 83 is located at the opposite end in sides 80A and 80C. A swing C washer disengaging rod 84 is secured to fourth side 80D and extends upwardly and behind fourth side 80D and at an angle thereto.

Second upper horizontal pivot tube 90 (FIG. 10) is a mirror image of first upper horizontal pivot tube 80. Thus, second upper horizontal pivot tube 90 is a generally square tube having first side 90A, second side 90B, third side 90C and fourth side 90D. A bracket 91 extends from side 90C in a direction generally perpendicular thereto. A pair of holes 92 is located at one end of first upper horizontal pivot tube 90 in first side 90A and third side 90C. A second set of holes 93 is located at the opposite end in sides 90A and 90C. A swing C washer disengaging rod 94 is secured to fourth side 90D and extends upwardly and behind fourth side 90D and at an angle thereto.

Lower horizontal pivot tubes 100 (FIG. 11) are generally square tubes including first side 100A, second side 100B, third side 100C and fourth side 100D. A pair of holes 101 is located in second side 100B and fourth side 100D at one end of each lower horizontal pivot tube 100. A second set of holes 102 is located at the opposite end in second side 100B and fourth side 100D. Both lower horizontal pivot tubes are identical in configuration.

First vertical support tube 110 (FIG. 12) of frame 30 is a generally square tube having a first side 110A, a second side 110B, a third side 110C and a fourth side 110D. First vertical support tube 110 includes first shoulder bolt 111 extending in a generally perpendicular direction from side 110C and a second shoulder bolt 112 extending in a generally perpendicular direction from first side 110A. Two nuts 113 are welded to side 110A at opposite ends of first vertical support tube 110. Nuts 113 are positioned such that the openings therein are coaxial with holes (not shown) in first side 110A. A stop tab 114 is secured to second side 110B of first vertical support tube 110 and extends in a generally perpendicular direction thereto.

Second vertical support tube 120 (FIG. 13) is a mirror image of first vertical support tube 110. Thus, second vertical support tube 120 is a generally square tube having a first side 120A, a second side 120B, a third side 120C and a fourth side 120D. First vertical support tube 120 includes first shoulder bolt 121 extending in a generally perpendicular direction from side 120C and a second shoulder bolt 122 extending in a generally perpendicular direction from first side 120A. Two nuts 123 are welded to side 120A at opposite ends of first vertical support tube 120. Nuts 123 are positioned such that the openings therein are coaxial with holes (not shown) in first side 120A. A stop tab 124 is secured to second side 120B of first vertical support tube 120 and extends in a generally perpendicular direction thereto.

Returning to FIG. 3, first vertical support tube 110 and second vertical support tube 120 are dimensioned so as to receive legs 130 in a telescoping manner. Legs 130 a generally square tubes having holes (not shown) at one end thereof. The holes provide a location for attaching brackets 134 to legs 130 by means of bolts or similar fasteners. Bolts 132 are used to secure legs 130 in first vertical support tube 110 and second vertical support tube 120 as described below.

Two horizontal crossbars 140 are welded between first vertical support tube 110 and second vertical support tube 120 and hold them in a predetermined spaced-apart relationship. In this manner, first vertical support tube 110 and second vertical support tube 120 are securely joined at a predetermined distance.

Adjustable horizontal crossbar 150 includes a generally square tube 152 and an insert 154. Insert 154 is dimensioned so as to fit within tubular member 152 in a telescoping fashion. A pair of nuts (not shown) are welded to one surface of tubular member 152 over a pair of holes therein in the same manner as described above with respect to nuts 113 on first vertical support tube 110 and nuts 123 on second vertical support tube 120. Tube 152 is welded to one lower horizontal pivot tube 100 and insert 154 is welded to the remaining lower horizontal pivot tube 100. In this manner, one lower horizontal pivot tube 100 and tube 152 form a generally T-shaped structure and the remaining lower horizontal pivot tube 100 and insert 154 form another generally T-shaped structure.

To assemble frame 30, first vertical pivot tube 60 is secured to first bracket 40 by inserting a bolt through holes 68 in first vertical pivot tube 60 and holes 44 in first bracket 40 and threading a nut on the bolt. When securing first vertical pivot tube 60 to first bracket 40, swing C washer 67 is hooked around hinge rod 48 by pulling swing C washer 67 back and positioning it around hinge rod 48. Because swing C washer 67 is spring loaded, it snaps securely around hinge rod 48 when released.

Similarly, second vertical pivot tube 70 is secured to second bracket 50 by inserting a bolt or similar fastener through holes 54 in bracket 50 and holes 78 in second vertical pivot tube 70. Swing C washer 77 of second vertical pivot tube 70 is hooked around hinge rod 58 of second bracket 50 in the same manner as described in connection with firs bracket 40 and first vertical pivot tube 60.

Next, first upper horizontal pivot tube 80 is secured to first vertical pivot tube 60 by inserting shoulder bolt 66 through holes 83 in first upper horizontal pivot tube 80. When attaching first upper horizontal pivot tube 80 to first vertical pivot tube 60, swing C washer disengaging rod 84 is positioned above rod 67B of swing C washer 67. A nut is threaded onto the end of shoulder bolt 66 to secure first upper horizontal pivot tube 80 in place. Second upper horizontal pivot tube 90 is secured to second vertical pivot tube 70 in the same fashion. Namely, shoulder bolt 76 of second vertical pivot tube 70 is inserted through holes 93 on second upper horizontal pivot tube 90 and secured thereto with a nut. Again, swing C washer disengaging rod 94 is positioned above rod 77B of swing C washer 77.

Next, first vertical support tube 110 and second vertical support tube 120, with horizontal crossbars 140 already welded thereto, are secured to first upper horizontal pivot tube 80 and second upper horizontal pivot tube 90. This is accomplished by inserting shoulder bolt 112 on first vertical support tube 110 through holes 83 on first upper horizontal pivot tube 80 and inserting shoulder bolt 122 on second vertical support tube 120 through holes 93 on second upper horizontal pivot tube 90. Nuts are used to secure first upper horizontal pivot tube 80 on shoulder bolt 112 and second upper horizontal pivot tube 90 on shoulder bolt 122.

The two lower horizontal pivot tubes 100, one with tubular member 152 secured thereto and one with insert 154 secured thereto, are then attached to first vertical pivot tube 60, second vertical pivot tube 70, first vertical support tube 110 and second vertical support tube 120. This is accomplished by inserting insert 154 in tubular member 152 far enough so that lower horizontal pivot tubes 100 and adjustable crossbar 150 may be positioned within the perimeter formed by first vertical pivot tube 60, second vertical pivot tube 70, first vertical support tube 110 and second vertical support tube 120. The lower horizontal pivot tube 100 having tubular member 152 attached thereto is then secured to first vertical pivot tube 60 and first vertical support tube 120 by inserting shoulder bolt 62 on first vertical pivot tube 60 through holes 102 and inserting shoulder bolt 113 on first vertical support tube 110 through holes 101. Similarly, shoulder bolt 72 on second vertical pivot tube 70 is inserted through holes 102 on the lower horizontal pivot tube 100 having insert 154 secured thereto and shoulder bolt 121 of second vertical support tube 120 is inserted through holes 101. Lower horizontal pivot tubes are secured by use of nuts. Adjustable horizontal crossbar 150 is then adjusted to the proper length by sliding insert 154 relative to tubular member 152. Bolts 156 are then inserted in nuts (not shown) on tubular member 152 and advanced so as to enter the holes (not shown) in tubular member 152 and tightened so as to clamp on insert 154 and hold it in place.

Legs 130 are then inserted in both ends of first vertical support tube 110 and second vertical support tube 120 and secured in place by inserting bolts 132 through nuts 113 and 123 and clamping bolts 132 against legs 130. Brackets 134 may then be attached to legs 130 by inserting bolts through holes in legs 130 and brackets 134 and threading a nut on the end of each bolt.

To complete assembly of frame 30, a first gas rod 160 is secured between first vertical pivot tube 60 and first upper horizontal pivot tube 80 by securing one end of gas rod 160 to bracket 61 and the other end of gas rod 160 to bracket 81. A second gas rod 160 is secured to second vertical pivot tube 70 and second upper horizontal pivot tube 90 by securing one end of gas rod 160 to bracket 71 and the other end of gas rod 160 to bracket 91.

Next, a first gas rod 140 is secured between first vertical pivot tube 60 and first bracket 40 by securing one end of first gas rod 140 to barrel nut 64 on first vertical pivot tube 60 and the second end of first gas rod 140 to barrel nut 49 on first bracket 40. A second gas rod 140 (not shown) is secured between second vertical pivot tube 70 and second bracket 50 by securing one end of second gas rod 140 to barrel nut 74 on second vertical pivot tube 70 and the second end of second gas rod 140 to barrel nut 59 on second bracket 50.

In operation, wind deflector 20 is secured to frame 30 by inserting bolts or similar fasteners through brackets 134 and into wind deflector 20. Legs 130 may be adjusted to insure proper attachment and alignment of wind deflector 20. With wind deflector 20 in its lower position (FIG. 14) frame 30 is collapsed such that first vertical support tube 110 is adjacent first vertical pivot tube 60 and second vertical support tube 120 is adjacent second vertical pivot tube 70. First and second vertical support tubes 110 and 120 are held in spaced apart relation from first and second vertical pivot tubes 60 and 70 by tab 114 on first vertical support tube 110 contacting side 60A of first vertical pivot tube 60 and tab 124 of second vertical support tube 120 contacting side 70A of second vertical pivot tube 70. This slight spaced apart relationship between first and second vertical support tubes 110 and 120 and first and second vertical pivot tubes 60 and 70 prevents gas rods 160 from progressing past their zero point into the negative region.

Figure 14:
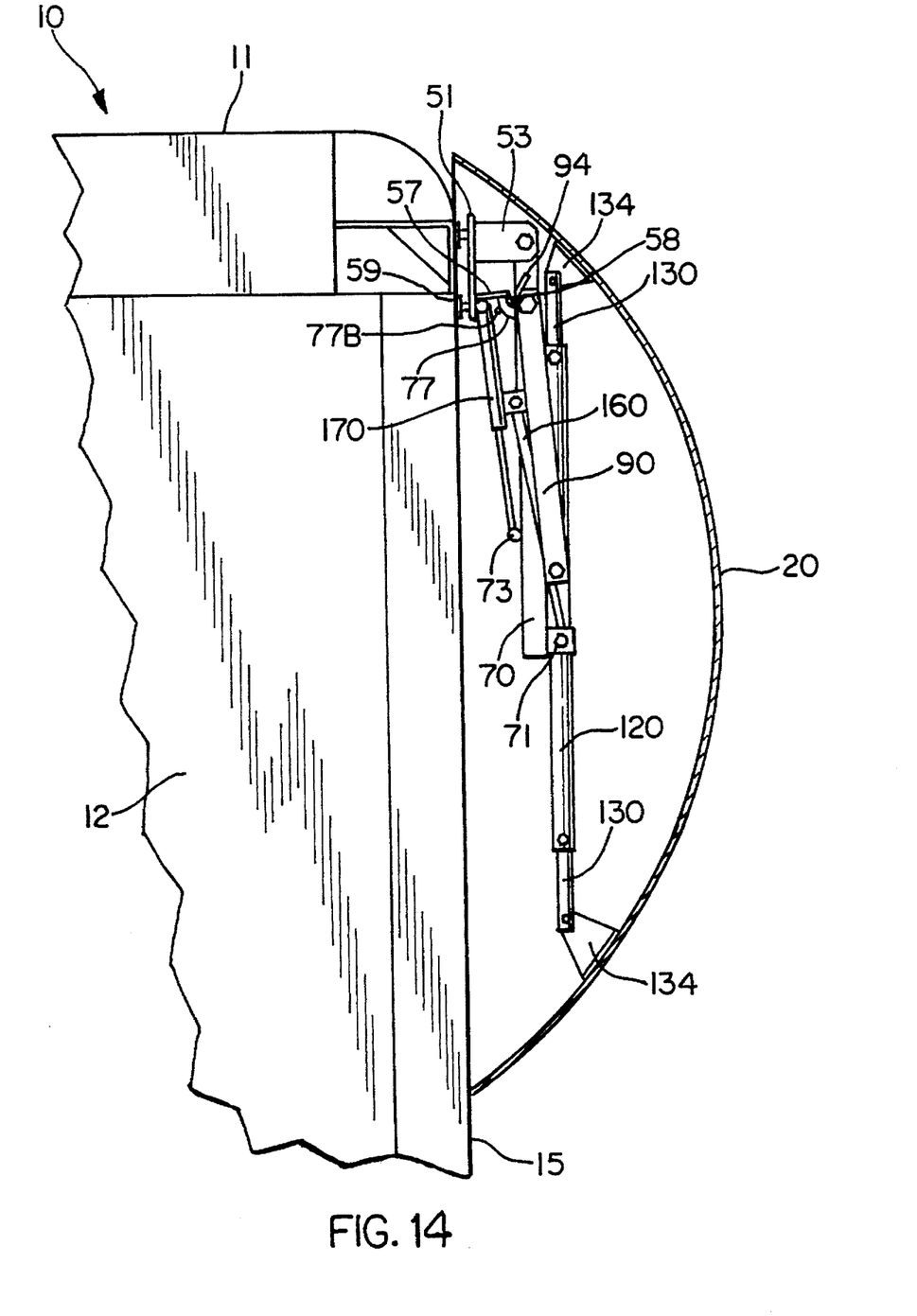
FIG. 14 is a left side plan view along line 14—14 in FIG. 1 with the wind deflector partially cut away and in its lowered position.

In the collapsed position shown in FIG. 14, first upper horizontal pivot tube 80 and second upper horizontal pivot tube 90 are disposed at a slight angle to first and second vertical support tubes 110 and 120, respectively, and to first and second vertical pivot tubes 60 and 70, respectively, so as to be substantially vertical as well. The same is true with respect to lower horizontal pivot tubes 100, which are hidden from view in FIG. 15. In this position, swing C washers 67 and 77 are hooked around and engaged with hinge rods 48 and 58 of first and second brackets 40 and 50, as described above. In this manner, wind deflector 20 is held in place against trailer 10.

Figure 15:
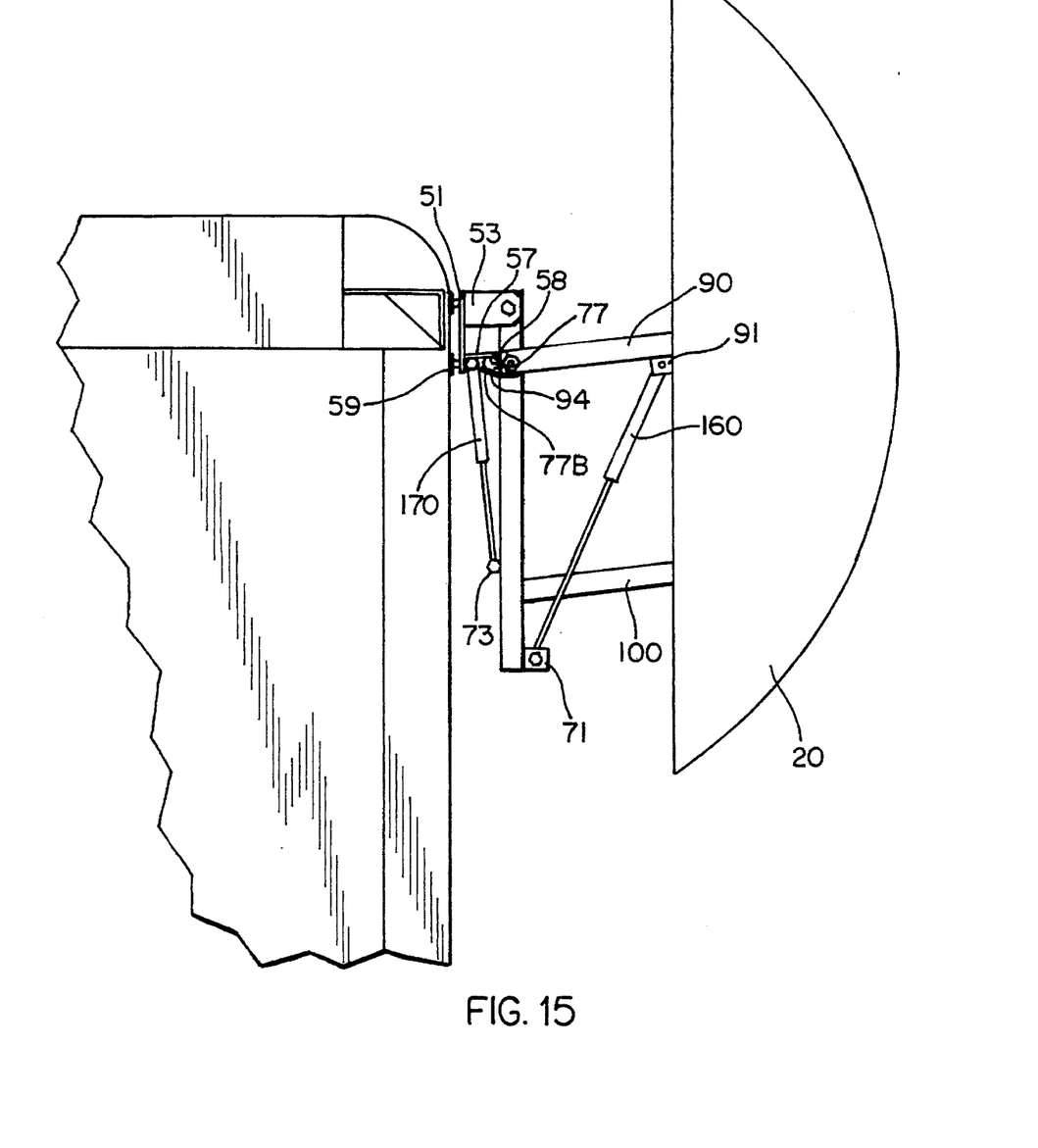
FIG. 15 is a left side plan view of the front portion of the trailer shown in FIG. 1 with the wind deflector in its intermediate position.

FIG. 15 shows wind deflector 20 in its intermediate position. Specifically, wind deflector 20 has been lifted out and away from trailer 10. As this occurs, lower horizontal pivot tubes 100 rotate about shoulder bolts 62 and 72 on first vertical pivot tube 60 and second vertical pivot tube 70. Similarly, first upper horizontal pivot tube 80 and second upper horizontal pivot tube 90 rotate about shoulder bolt 66 of first vertical pivot tube 60 and shoulder bolt 76 of second vertical pivot tube 70. The shoulder bolts provide clearance between the rotating members to assist with ease of rotation. This motion causes first gas rods 130 and second gas rods 140 to extend. Additionally, as first upper horizontal pivot tube 80 and second upper horizontal pivot tube 90 rotate, swing C washer disengaging rods 84 and 94 move downwardly in a counterclockwise direction and strike rod 67B of swing C washer 67 and rod 77B of swing C washer 77. This movement applies force to rods 67B and 77B and causes movement of swing C washers 67 and 77 so as to disengage swing C washers 67 and 77 from hinge rods 48 and 58 on first bracket 40 and second bracket 50. Thus, in the intermediate position shown in FIG. 16, swing C washers 67 and 77 are no longer engaging hinge rods 48 and 58. Note that in this position it is still not possible to fully open doors 16 of trailer 10 because wind deflector 20 and frame 30 are in the path of travel of doors 16.

Figure 16:
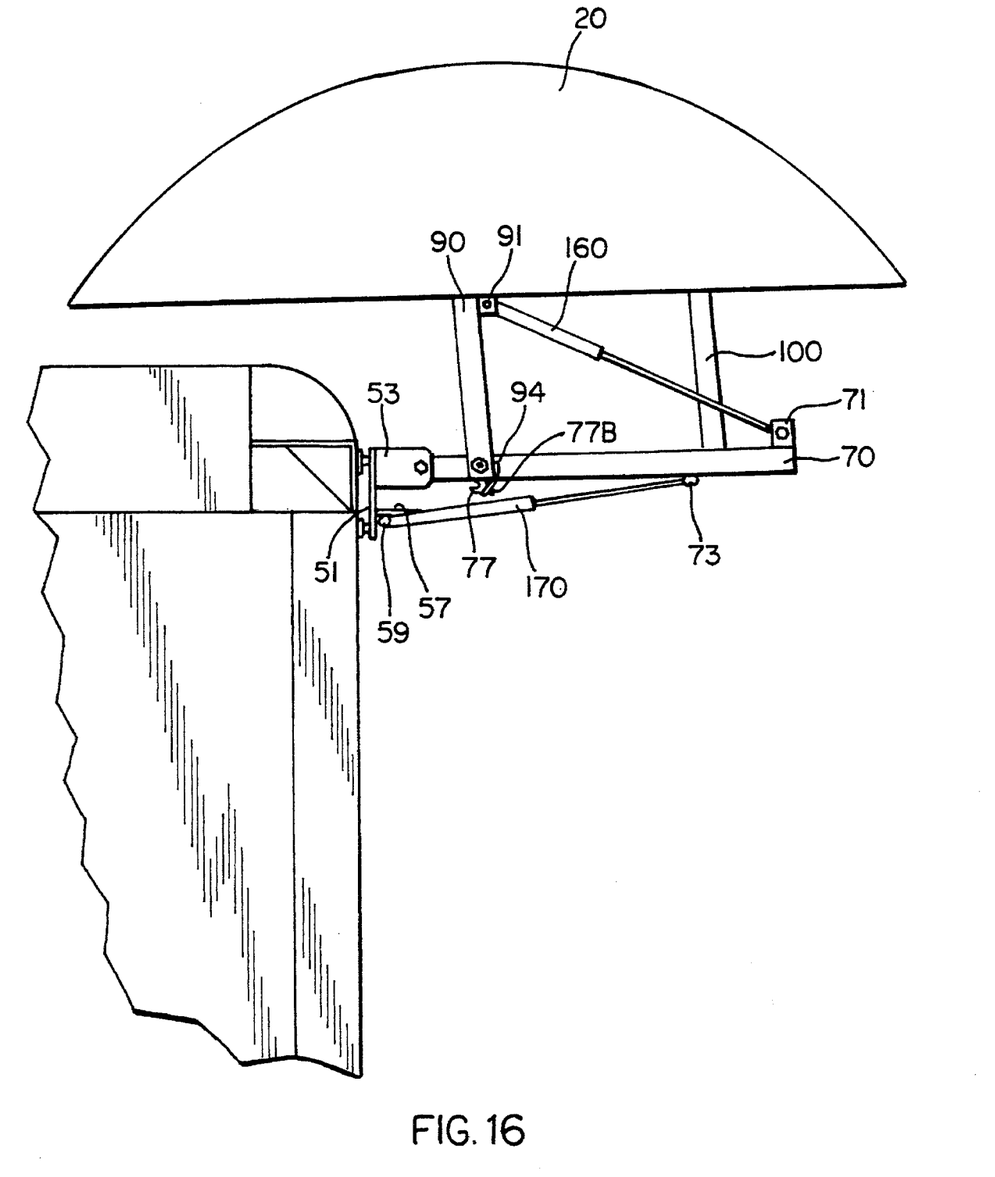
FIG. 16 is a left side plan view of the front portion of the trailer shown in FIG. 1 with the wind deflector in its fully raised position.

The final, fully raised position of wind deflector 20 is shown in FIG. 16. To place wind deflector 20 in this position, wind deflector 20 is lifted such that first vertical pivot rod 60 and second vertical pivot rod 70 rotate upwardly about the bolts or similar fasteners securing first vertical pivot rod 60 to first bracket 40 and second vertical pivot rod 70 to second bracket 50. The rotation of frame 30 is limited by stop member 46 on first bracket 40. Specifically, when frame 30 reaches the limit of its range of rotation, first vertical pivot tube 60 strikes stop member 46, thereby preventing further movement. In this position, second gas rods 170 are extended so as to provide counterbalance to the weight of frame 30 and wind deflector 20.

Figure 17:
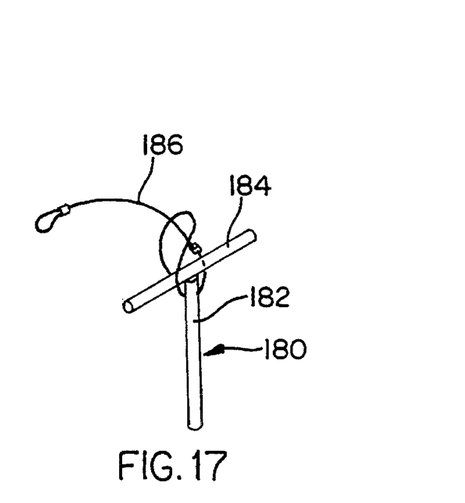
FIG. 17 is a perspective view of a locking handle for use in conjunction with a frame according to the present invention.

To maintain wind deflector 20 in the fully raised position, locking handle 180 (FIG. 17) may be used. Locking handle 180 is a generally T-shaped member having a first rod 182 and a second rod 184. A cable 186 is wrapped around rods 184 and 182 of locking handle 180 and may be secured to the trailer so that locking handle 180 may be readily located. To secure wind deflector 20 in the fully raised position, rod 182 of locking handle 180 is inserted through holes 45 of first bracket 40 and holes 69 of first vertical pivot tube 60. Thus, rotation of first vertical pivot tube 60 (and all of frame 30) is prevented.

Although the invention has been described and illustrated in detail, it is to be clearly understood that the same is by way of illustration and example only and is not to be taken by way of limitation. Numerous alterations to the above described embodiment may be made without departing from the invention. For example, although the various members of frame 30 are shown as square tubes, it will be readily appreciated by those skilled in the art that tubes of other cross-sectional configurations may also be used. Additionally, the first upper horizontal pivot tube 80, second upper horizontal pivot tube 90, lower horizontal pivot tubes 100 and gas rods 160 could be lengthened so as to allow wind deflector 20 to be moved farther back over top 11 of trailer 10. Accordingly, the spirit and scope of the invention are to be limited only by the terms of the appended claims.

What is claimed is:

1. A frame for attaching a wind deflector to a trailer, comprising:

a first plurality of brackets for attaching said frame to the trailer;

a plurality of vertical pivot tubes attached to said first brackets;

a plurality of horizontal pivot tubes attached to said vertical pivot tubes;

a plurality of vertical support tubes attached to said horizontal pivot tubes; and a second plurality of brackets attached to said vertical support tubes, said second plurality of brackets for securing the wind deflector to the trailer.

2. The frame according to claim 1, further including a plurality of second horizontal pivot tubes attached to said vertical pivot tubes and said vertical support tubes.

3. The frame according to claim 2, further including at least one gas rod attached to one of said horizontal pivot tubes and one of said vertical pivot tubes.

4. The frame according to claim 3, further including at least one gas rod attached to one of said vertical pivot tubes and one of said first brackets.

5. The frame according to claim 4, further including telescoping legs inserted in each of said vertical support tubes.

6. The frame according to claim 5, wherein said second plurality of brackets are attached to said telescoping legs.

7. The frame according to claim 6, further including at least one crossbar joining said vertical support tubes.

8. The frame according to claim 7, further including at least one crossbar joining said second plurality of horizontal pivot tubes.

9. The frame according to claim 8, wherein said crossbar joining said second plurality of horizontal pivot tubes is telescopically adjustable.

10. The frame according to claim 9, further including a third plurality of brackets attached to said legs, said third plurality of brackets for further securing the deflector to said frame.

11. The frame according to claim 1, further including at least one gas rod attached to one of said horizontal pivot tubes and one of said vertical pivot tubes.

12. The frame according to claim 1, further including at least one gas rod attached to one of said vertical pivot tubes and one of said first brackets.

13. The frame according to claim 1, further including legs adjacent said vertical support tubes.

14. The frame according to claim 13 wherein said legs are adjustable.

15. The frame according to claim 13, wherein said second plurality of brackets are attached to said legs.

16. The frame according to claim 1, further including at least one crossbar joining said vertical support tubes.

17. The frame according to claim 2, further including at least one crossbar joining two of said second horizontal pivot tubes.

18. The frame according to claim 17, wherein said crossbar joining said second horizontal pivot tubes is adjustable.

19. The frame according to claim 13, further including a third plurality of brackets attached to said legs, said third plurality of brackets for further securing the deflector to said frame.

20. A frame for attaching a wind defector to a trailer, comprising:

first means for attaching said frame to the trailer, said first means pivotable with respect to the trailer and including a plurality of vertical pivot tubes having brackets attached thereto;

second means for attaching said frame to the deflector;

third means for pivotally securing said first and second means; and wherein said third means pivots with respect to said first means and said second means pivots with respect to said first means and said third means.

21. The frame according to claim 20, wherein said second means includes a plurality of vertical support tubes.

22. The frame according to claim 20, wherein said second means includes a pair of adjustable legs.

23. The frame according to claim 20, wherein said third means includes a plurality of horizontal pivot tubes.

24. The frame according to claim 23, wherein said third means further includes a pair of gas rods attached to said vertical pivot tubes of said first means and one of said plurality of horizontal pivot tubes of said third means.

25. The frame according to claim 20, further including a pair of gas rods attached to said vertical pivot tubes of said first means and said brackets attached to said vertical pivot tubes of said first means.

26. The frame according to claim 21, further including at least one crossbar joining said vertical support tubes of said second means.

27. The frame according to claim 23, further including at least one crossbar joining two of said horizontal pivot tubes of said third means.

28. The frame according to claim 27, wherein said crossbar joining said horizontal pivot tubes of said third means is adjustable.

* * * * *